United States Patent Office 3,475,267
Patented Oct. 28, 1969

3,475,267
**LAMINATES BONDED WITH AN ETHYLENE/
CROTONIC ACID COPOLYMER SALT**
Charles E. Miles, Ballwin, Mo., assignor to Monsanto
Company, St. Louis, Mo., a corporation of Delaware
No Drawing. Filed Mar. 4, 1965, Ser. No. 437,291
Int. Cl. B32b 27/10, 17/10, 15/08
U.S. Cl. 161—203        15 Claims

ABSTRACT OF THE DISCLOSURE

Laminates employing an ethylene/crotonic acid copolymer salt as an adhesive coating to secure the layers of the structure together, said copolymer salt comprising at least about 5 weight percent polymerized crotonic acid in salt form.

---

This invention relates to substrates such as paper, glass, metal, wood, synthetic materials, etc., having a coating thereon comprising a water-sensitive, heat-sealable adhesive and to laminated structures thereof.

Adhesives in which flow during application and adherence during bonding are effected by means of a volatile liquid carrier are known as solvent-sensitive adhesives. Many of these adhesives are water-sensitive, such as the water-soluble glues, gums, starches and synthetic resins.

Inactive solids at normal temperatures which may be converted by application of heat to a sticky or molten condition are known as heat-sealable adhesives. Commercial examples of heat-sealable adhesives include waxes, cellulose derivatives, vinyl esters, rubber and rubber derivatives. Heat-sealable adhesives usually exhibit greater toughness, flexibility and chemical resistance than water-sensitive adhesives. At the same time, however, heat-sealable adhesives are more difficult to activate and use in comparison to water-sensitive adhesives in many applications.

It has now been found that the salts of ethylene-crotonic acid copolymers are water-sensitive, heat-sealable adhesives having properties normally associated with heat sealable adhesives, which properties are retained whether the adhesives are activated by water or heat. By the discovery of the present invention, a substrate having a coating thereon of a salt of an ethylene/crotonic copolymer can be adhesively secured to another article either by means of heat activation of the adhesive coating or by means of water activation of the adhesive coating.

The term "E/CA" as used herein means ethylene/crotonic acid.

The E/CA copolymers used to form the E/CA copolymer salts useful as adhesives in this invention generally contain about 5%–40% by weight of polymerized crotonic acid. E/CA copolymers containing more than 40 weight percent polymerized crotonic acid, e.g. amount up to 75 weight percent polymerized crotonic acid, may be used but such higher amounts are not required and offer no particular advantages. E/CA copolymers containing less than about 5 weight percent polymerized crotonic acid are heat-sealable but they are generally ineffective for the purposes of this invention since their water sensitivity is relatively low.

Crotonic acid content as used herein has reference to that part of the copolymer derived from crotonic acid monomer and is determinable by analysis of the copolymer. The E/CA copolymers used in the present invention ordinarily have number average molecular weights in the range of 500 to 10,000 or even 20,000 as determined by standard osmometric procedures. The E/CA copolymer may contain, in addition to ethylene and crotonic acid, a small amount, e.g. up to about 15 weight percent or more, or one or more other polymerizable ethylenically unsaturated monomers such as vinyl chloride, acrylonitrile, arcrylamide, vinyl acetate and the like.

The copolymerization of ethylene and crotonic acid to form E/CA copolymers, the salts of which are water-sensitive, heat-selable adhesives useful in accordance with this invention, may be carried out batchwise or continuously in the presence of a catalyst such as an organic peroxide, e.g. tertiary butyl hydroperoxide, at a pressure from 500 to 40,000 p.s.i. and at a temperature of $-60°$ C. to $300°$ C. A tubular reactor, stirred autoclave or other equipment capable of withstanding the high pressures required for copolymerization may be used. These copolymers and process of making them are more fully described in copending application Ser. No. 149,564 filed Nov. 2, 1961, now abandoned, and assigned to the assignee of the present invention.

As mentioned hereinbefore, E/CA copolymers having about 5%–75% by weight polymerized crotonic acid content may be used to form the E/CA salts useful as adhesives in this invention but it is not necessary that the total polymerized crotonic acid content thereof be present in the salt form. The E/CA salts which have been found useful in accordance with this invention are those E/CA copolymers which contain about 5%–75% by weight polymerized crotonic acid in the salt form and 0–70% by weight polymerized crotonic acid in the acid form, the total amount of polymerized crotonic acid being about 5%–75% by weight.

The water-sensitive, heat-sealable E/CA copolymer salts of this invention can be applied to the substrates with a volatile liquid carrier such as an organic solvent or water. E/CA copolymer salts are soluble in organic solvents such as xylene and their application may be effected in a solution thereof. It is preferred, however, to apply the E/CA copolymer salts to a substrate by means of an aqueous emulsion of the copolymer salt since such salts are generally self-emulsifiable in water. The aqueous adhesive emulsions may be applied by any of the conventional means such as dipping, brushing, painting, spraying and the like.

The following examples will serve to illustrate the following invention. Parts and percents are by weight unless otherwise indicated.

Typical properties of some of the E/CA copolymers suitable for use in the present invention are indicated in Table 1.

TABLE I

| E/CA | CA [1] | Specific Viscosity [2] | M.P. ° C. |
|---|---|---|---|
| Type A | 5.5 | 0.46 | 104–106 |
| Type B | 8.5 | 0.112 | 65–67 |
| Type C | 8.7 | 0.120 | 68–70 |
| Type D | 9.5 | 0.132 | 70–72 |
| Type E | 17.6 | 0.169 | 64–66 |
| Type F | 18.1 | 0.081 | 56–58 |
| Type G | 19.5 | 0.134 | 60–62 |
| Type H | 20.8 | 0.081 | 53–55 |
| Type I | 24.6 | 0.098 | 53–55 |
| Type J | 29.4 | 0.064 | 54–56 |
| Type K | 35.8 | 0.035 | 44–45 |

[1] Wt. percent polymerized crotonic acid content of the E/CA copolymer.
[2] Measured at 1% by weight of copolymer in xylene at 105° C. Specific viscosity as used herein means the (viscosity of solution−viscosity of solvent)/viscosity of solvent.

EXAMPLE 1

An emulsion containing an adhesive E/CA copolymer salt is prepared with the following ingredients:

| | Parts |
|---|---|
| (1) E/CA copolymer (Type F, 18.1% CA) | 5 |
| (2) KOH (20% aqueous solution) | 4 |
| (3) Water | 20 |

The E/CA copolymer is melted and the molten copolymer added to a solution of (2) and (3) at 70° C. with hand stirring. A white stable emulsion of near grease consistency is produced upon cooling.

EXAMPLE 2

The emulsion of Example 1 is coated on ten sheets of kraft paper by means of a trailing blade coater at a dry coat weight of about 15 lbs./ream (3000 sq. ft.) and allowed to dry. The dry potentially adhesive coating of potassium-E/CA salt is smooth and non-tacky. Five of the coated kraft paper sheets, after heat activation of the adhesive coating at 140° F. for 5 seconds, are adhesively secured to kraft paper, aluminum foil, glass and tin plate, respectively. Paper fiber failure occurs in all cases during separation of these laminae.

The remaining five coated kraft paper sheets, after water activation of the adhesive coatings by submergence at 25° C. for one second are adhesively secured to kraft paper, aluminum foil, glass and tin plate, respectively, and allowed to dry. Paper fiber failure occurs in all cases during separation of these laminae.

EXAMPLES 3-7

In Examples 3-7, the following emulsions of E/CA copolymer salts are prepared according to the method of Example 1.

| | E/CA Copolymer | | | | Base, Parts | Water, Parts |
|---|---|---|---|---|---|---|
| Ex | Type | Parts | Percent CA | | | |
| 3 | A | 5 | 8.5 | NaOH | a 3 | b 20 |
| 4 | E | 5 | 17.6 | Morpholine | 2 | 20 |
| 5 | I | 5 | 24.6 | Triethanolamine | 2 | 15 |
| 6 | J | 5 | 29.4 | Triethylamine | 2 | 15 |
| 7 | K | 5 | 36.8 | KOH | a 10 | 10 | a As 20% aqueous solutions of the neutralizing agents.
b The water contained 10% by weight of Tergitol NPX based on the E/CA copolymer. Tergitol NPX, a product of Union Carbide Company, is a nonyl phenyl polyethylene glycol ether.

EXAMPLE 8

Each of the emulsions prepared in Examples 3-7 are coated on ten sheets of kraft paper at a dry coat weight of 15 lbs./ream (3000 sq. ft.) and allowed to dry. The dry potentially adhesive coatings of the E/CA copolymer salts are smooth and non-tacky. Five of the coated sheets from each example, after heat activation of the adhesive at a temperature of about the melting point of the copolymer for 5 seconds are adhesively secured to kraft paper, aluminum, glass, tin plate and polyethylene film, respectively. The remaining five coated sheets from each example, after water activation of the adhesive by submergence at 25° C. for one second, are adhesively secured to kraft paper, aluminum, glass, tin plate and polyethylene film, respectively, and allowed to dry. Paper fiber failure occurs in all fifty cases during separation of these laminae.

EXAMPLE 9

A ten weight percent solution of sodium-E/CA copolymer salt (Type G E/CA copolymer having 19.5 weight percent crotonic acid in salt form) in xylene is prepared at 55° C. The solution is coated on ten sheets of kraft paper at a dry coat weight of 15 lbs./ream (3000 sq. ft.) and allowed to dry. The dry potentially adhesive coatings are smooth and non-tacky. Five of the coated sheets, after heat activation of the adhesive at 65° C. for 5 seconds are adhesively secured to kraft paper, aluminum, glass, tin plate and poyethylene film, respectively. The remaining five coated sheets, after water activation of the adhesive by submergence at 25° C., for one second, are adhesively secured to kraft paper, aluminum, glass, tin plate and polyethylene film, respectively, and allowed to dry. Paper fiber failure occurs in all cases during separation of these laminae.

The above examples illustrate the advantages of this invention. One advantage is the versatility of a substrate coated with an E/CA copolymer salt. Such a substrate can be adhesively secured to another article by two common methods of application, namely, heat activation and water activation. Another advantage is that the adhesive bonds of laminated structures containing the adhesive coated substrates of this invention exhibit the adhesion, toughness, flexibility and chemical resistance usually found in heat sealable adhesives even when activated for use with water. A further advantage is that the adhesives may be applied to substrates as solutions or emulsions and when applied as emulsions an emulsifying agent is not generally required.

This invention is not limited to any particular salt of an E/CA copolymer. In general the applicable E/CA copolymer salts are the amine salts and the Group I salts as given in The Handbook of Chemistry and Physics, 29th ed. (1945) at p. 312 such as lithium, sodium, potassium, copper, and silver. Mixtures of these E/CA copolymer salts may be used if desired.

In general any compound which is a hydrogen acceptor can be employed to neutralize E/CA copolymers and form salts thereof. The preferred neutralizing agents include by way of example the alkali metal hydroxides such as sodium hydroxide and potassium hydroxide; organic amines such as the primary, secondary and tertiary alkyl and hydroxyalkyl amines containing up to about 10 carbon atoms in each alkyl group, e.g. methylamine, ethylamine, hydroxyethylamine, n-propylamine, isopropylamine, n-butylamine, isobutylamine, n-hexylamine, diethylamine, diisopropylamine, triethylamine, triethanolamine, methyldiethylamine and the like; aryl, aralkyl and alkaryl amines such as aniline, 2-aminobiphenyl, 1-naphthylamine, O-methylaniline, 2,3-dimethylaniline, cumidine, O-methoxyaniline, benzylamine, phenethylamine, dimethylaniline and the like; heterocyclic amines such as pyridine, 2-aminopyridine, pyrazine, oxazine, oxazole and the like, and alicyclic amines such as cyclohexylamine and dicyclohexylamine. Mixtures of these neutralizing agents may be used if desired. Ammonium hydroxide will neutralize E/CA copolymers and form the ammonium-E/CA copolymer salt but this salt is not generally useful as a water-sensitive, heat-sealable adhesive. When the ammonium-E/CA copolymer salt is coated on a substrate and allowed to dry, decomposition occurs and the ammonia evaporates along wiith the volatile liquid carrier leaving only a coating of E/CA copolymer which is not water sensitive.

An excess amount of neutralizing agent can be used although as noted hereinbefore such amounts are not generally required in the preparation of E/CA copolymer salts applicable in this invention. Illustrative of this is an E/CA copolymer having 30 weight percent polymerized crotonic acid content of which only 50% thereof has been neutralized. Such a copolymer contains 15 weight percent polymerized crotonic acid in the acid form and 15 weight percent polymerized crotonic acid in the salt form and is entirely applicable in this invention.

E/CA copolymers can be neutralized to their salt form and the salt dissolved in organic solvent to form a solution or added to water to form an aqueous emulsion. For this purpose the E/CA copolymer salts can be prepared by melting the copolymer in a vessel in the presence or absence of a solvent, adding the neutralizing agent while stirring, cooling the resulting E/CA copolymer salt and storing until use. It is preferred, however, particularly when effecting application of the salt to the substrate by means of an aqueous emulsion to form the salt simultaneously with the emulsion.

The present invention is not limited to any particular method of preparing the aqueous E/CA copolymer salt emulsions. Direct addition of molten E/CA copolymer or salt thereof to water at a temperature of about 50° C. to 100° C. is a satisfactory method of producing the emulsions. However, the emulsions may also be prepared by adding the water to the E/CA copolymer melt. Where the emulsions are prepared at the same time the E/CA copolymers are neutralized, one or more neutralizing agents must be present. The neutralizing agent is usually added to the water although it may be added to the copolymer melt or to both the melt and water. With E/CA copolymer salts containing about 5% to 15% by weight of polymerized crotonic acid in salt form a small amount of an emulsifier is usually required to form an emulsion. E/CA copolymer salts containing more than about 15% by weight crotonic acid in salt form are self-emulsifiable and an emulsifying agent is not required.

Any method of providing agitation during the period of addition of the emulsion ingredients may be used. For example, any commercial colloid mill, homogenizer, high speed stirring device or commercial ultrasonic device effecting localized mixing at the point of addition of the melt and water may be used to prepare the emulsions. Moreover, in certain cases mere hand stirring is sufficient for production of stable emulsions.

As mentioned hereinbefore when an E/CA copolymer containing about 5% to 15% by weight of polymerized crotonic acid in salt form is used as an adhesive and is to be applied to the substrate in aqueous emulsion a small amount of emulsifier is required to form the emulsion. The proportion of emulsifier relative to the total solids content of the emulsion (E/CA copolymer salt) is advantageously about 5% to 15% by weight. Greater amounts can be used if desired but such amounts are not generally required.

The emulsifying agent component of the system can be selected from a wide variety of available anionic or nonionic materials. Representative anionic emulsifying agents are sodium oleate, sodium stearate, ammonium oleate, triethanolamine stearate, monoethanolamine stearate, ammonium laurate, sodium or potassium salts of tall oil or rosin, and the various high molecular weight amines and amine salts.

Representative nonionic emulsifying agents are polyoxyethylene derivative of e.g. alcohols, acid, ethers, phenols, amides or amines, a large number of which are commercially available. They generally satisfy one of the following formula:

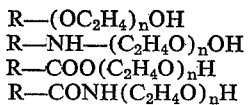

wherein R is an aliphatic, aryl or alkaryl hydrocarbon radical and $n$ is an integer of 6 to 30.

Among commercially available nonionic emulsifying agents which can be used in accordance with the present invention there may be mentioned the product "Alphenyl" which corresponds to the first of the aforementioned formula in which R is the butylphenylene radical and $n$ is 8, said product resulting from the condensation of about 8 mols of ethylene oxide with one mol of butyl phenol and the "Polyrad" products which correspond to the second of said formula wherein R—NH is the residue of rosin amine (dehydroabiethylamine) R—NH$_2$. In "Polyrad 1100," e.g. the integer $n$ is equal to 11. "Emulphor A" and "Ethofat 6060" are trade names of products which correspond to the third formula, RCOO— being the residue of oleic acid in the former and stearic acid RCOOH in the latter. Finally "Tergitol NPX" is the trade name of a product corresponding to the first formula in which R is the nonyl phenyl radical.

The E/CA copolymer salt coated substrate of this invention can be adhesively secured to any known solid surface. Thus they may be adhesively secured to such varied surfaces, as for example, those of glass, steel, aluminum, iron, fluoro-carbon polymers, urea-formaldehyde and melamine-formaldehyde polymers, paper, wood, leather, acrylic polymers, polyethers, polyesters, polyamides, polythenes such as polyethylene and organic and inorganic materials in general.

The E/CA copolymer salt coated substrates of this invention are particularly adaptable for use as adhesive tape and labels. Any flexible material is suitable for use as the tape substrate. Specific examples of substrate materials which can be employed are inorganic materials such as foils of metals such as aluminum, lead, platinum, gold and tin; glass cloth and glass cloth which has been coated with organosilicon resins and elastomers; asbestos tapes and organic materials such as cellulose esters, e.g. cellulose acetate, cellulose butyrate, cellulose nitrate, and cellulose propionate; cellulose ethers such as ethyl cellulose, butyl cellulose and benzyl celluose; viny polymers such as polyvinylchloride; polyvinyl alcohol and co-polymers of vinyl chloride-vinyl acetate and vinyl chloride-vinylidene chloride; polystyrene; polyamides, polyesters such as ethylene glycolterephthalates, polyethylene; fluorocarbon polymers such as polytetrafluoroethylene and polychlorotrifluoroethylene; organic elastomers such as natural rubber, GRS, Buna-S, chloroprene, neoprene, butadiene-styrene copolymers, acrylonitrile-butadiene copolymers and mixtures thereof; polysiloxane elastomers; sulfur containing elastomers such as ethylene polysulfides; acrylic polymers such as methyl methacrylate, acrylonitrile and methyl acrylate polymers and copolymers thereof; and organic fabrics such as cotton, linen, silk, wool, rayon, and any of the various synthetic organic fabrics.

What is claimed is:

1. A substrate having a coating of an ethylene/crotonic acid copolymer salt adherent thereto by means of which it may be adhesively secured to another article, said copolymer salt comprising at least about 5 weight percent polymerized crotonic acid in salt form.

2. The substrate of claim 1 wherein the adhesive coating comprises an amine salt of ethylene/crotonic acid copolymer.

3. The substrate of claim 1 wherein the adhesive coating comprises an alkali metal salt of ethylene/crotonic acid copolymer.

4. The coated substrate of claim 1 wherein the substrate is paper.

5. The coated substrate of claim 1, wherein the substrate is wood.

6. The coated substrate of claim 1 wherein the substrate is metal.

7. The coated substrate of claim 1 wherein the substrate is glass.

8. The coated substrate of claim 1 wherein the substrate is organic material in solid form.

9. Method of forming a laminated structure which comprises adhesively securing a substrate having an ethylene/crotonic acid copolymer salt adhesive coating on at least one side thereof, after activation of the adhesive, to another article, said copolymer containing at least about 5 weight per cent polymerized crotonic acid in salt form.

10. The method of claim 9 wherein said adhesive coating is activated by water.

11. The method of claim 9 wherein said adhesive coating is activated by heat.

12. The method of claim 9 wherein said adhesive coating is an amine salt of said ethylene/crotonic acid copolymer.

13. The method of claim 9 wherein said adhesive coating is an alkali metal salt of said ethylene/crotonic acid copolymer.

14. An article of manufacture which is a laminated structure in which layers are adhesively secured to each other by an ethylene/crotonic acid copolymer salt adhesive in which at least about 5 weight percent of the said copolymer is polymerized crotonic acid in salt form.

15. The substrate of claim 1 in which the copolymer salt is formed from a copolymer containing about 5% to 40% by weight of polymerized crotonic acid.

References Cited

UNITED STATES PATENTS

| | | | |
|---|---|---|---|
| 3,132,120 | 5/1964 | Graham et al. | 260—78.5 |
| 3,171,830 | 3/1965 | Kehr. | |
| 3,211,808 | 10/1965 | Young et al. | |
| 3,239,370 | 3/1966 | Thompson et al. | |
| 3,264,272 | 8/1966 | Rees | 156—332 |
| 3,293,112 | 12/1966 | Kehr. | |

FOREIGN PATENTS 963,380   7/1964   Great Britain.

OTHER REFERENCES

"Surlyn" Coatings for Sheet Metals, Du Pont publications, September 1963, 4 pages.

ROBERT F. BURNETT, Primary Examiner

LINDA M. CARLIN, Assistant Examiner

U.S. Cl. X.R.

117—138.8, 161; 156—334; 161—216, 250; 260—88.1, 94.9